US006883857B2

(12) United States Patent
Steinhauser et al.

(10) Patent No.: US 6,883,857 B2
(45) Date of Patent: Apr. 26, 2005

(54) STRUCTURE FOR A PASSENGER MOTOR VEHICLE AND METHOD OF MAKING SAME

(75) Inventors: Dieter Steinhauser, Remshalden (DE); Martin Goehrke, Loechgau (DE); Thomas Meier, Rheinstetten (DE); Liam Moloney, Leonberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/608,444

(22) Filed: Jun. 30, 2003

(65) Prior Publication Data

US 2004/0070233 A1 Apr. 15, 2004

(30) Foreign Application Priority Data

Jun. 29, 2002 (DE) .......................... 102 29 401

(51) Int. Cl.⁷ .......................... B62D 29/04; B60R 21/13
(52) U.S. Cl. .................. 296/181.2; 296/181.4; 296/187.02; 296/190.01; 296/193.03
(58) Field of Search .................... 296/29, 30, 181.1, 296/181.2, 181.4, 187.01, 187.02, 190.01, 190.08, 192, 193.01, 193.03, 193.04

(56) References Cited

U.S. PATENT DOCUMENTS

| 3,145,000 | A | | 8/1964 | Mackie .................. 244/123 |
| 3,550,948 | A | | 12/1970 | Thompson, Jr. ......... 296/181.2 |
| 4,422,685 | A | * | 12/1983 | Bonfilio et al. ......... 296/193.04 |
| 4,521,049 | A | * | 6/1985 | Genma et al. ........... 296/181.2 |
| 4,553,783 | A | * | 11/1985 | Lagana .................. 296/181.2 |
| 4,557,502 | A | * | 12/1985 | Scaduto et al. ......... 280/756 |
| 4,705,716 | A | * | 11/1987 | Tang ..................... 442/224 |
| 5,653,494 | A | | 8/1997 | Cleall et al. ............ 296/182 |
| 5,882,064 | A | * | 3/1999 | Emmons ................. 296/193.04 |
| 6,073,991 | A | * | 6/2000 | Naert .................... 296/187.02 |
| 6,206,458 | B1 | * | 3/2001 | Schroeder et al. ...... 296/203.01 |
| 6,276,477 | B1 | * | 8/2001 | Ida ....................... 180/89.1 |
| 6,523,628 | B1 | * | 2/2003 | Inaoka et al. .......... 180/90 |
| 6,601,873 | B1 | * | 8/2003 | Bartesch et al. ........ 280/784 |
| 6,619,715 | B1 | * | 9/2003 | Rackham ................ 296/29 |
| 6,786,536 | B1 | * | 9/2004 | Stoffels et al. ......... 296/193.03 |
| 2004/0070233 | A1 | * | 4/2004 | Steinhauser et al. ... 296/193.01 |
| 2004/0232725 | A1 | * | 11/2004 | Marelja ................. 296/181.1 |

FOREIGN PATENT DOCUMENTS

| DE | 31 39 458 | 6/1982 |
| EP | 0 286 058 | 10/1988 |
| EP | 0 523 850 | 1/1993 |
| FR | 1472560 | 3/1967 |
| WO | WO 96/00667 | 1/1996 |
| WO | WO 03/055715 | 12/2002 |

OTHER PUBLICATIONS

Patent Abstracts of Japan, Bd. 0091, Nr. 98 (M–404) Aug. 15, 1985, JP 60 061237 A (Yamaha Hatsudoki KK), Apr. 9, 1985, Zusammenfassung; Abblidungen.

* cited by examiner

*Primary Examiner*—D. Glenn Dayoan
*Assistant Examiner*—Paul Chenevert
(74) *Attorney, Agent, or Firm*—Crowell & Moring LLP

(57) ABSTRACT

A structure is provided for a passenger motor vehicle, which comprises a panel structure of non-metallic material, such as fiber-reinforced plastic. For optimization of the structure with regard to high strength, light weight, and functional performance, said structure comprises a passenger cell, the panel structure of which includes a front panel structure and a rear panel structure, while the panel structures are connected with a floor structure bordered by longitudinal girders extending between the panel structures.

39 Claims, 8 Drawing Sheets

STRUCTURE FOR A PASSENGER MOTOR VEHICLE AND METHOD OF MAKING SAME

This application claims the priority of German Application No. 102 29 401.1 filed on Jun. 29, 2002, the disclosure of which is expressly incorporated by reference herein.

The invention concerns a structure for a vehicle, specifically a passenger motor vehicle comprising a panel structure made of non-metallic material, such as fiber reinforced plastic.

A prior single-axle vehicle described in PCT Publication WO 96/00667 (corresponding U.S. Pat. No. 5,653,494), has been designed as a lightweight trailer comprising of a base frame carried by wheels and essentially made of non-metallic material. A vehicle body structure, based on hollow longitudinal girders, is made of similar material.

European Patent Document No. EP 0 286 058 A2 deals with a self-supporting structural element of composite material for a vehicle structure that is formed by a panel unit. The panel unit includes a transition piece that is bordered by surface layers. This structural element produces a good strength-to-weight ratio.

U.S. Pat. No. 3,145,000 represents a high-strength fiberglass reinforced component for an aircraft wing, which is provided with a panel section that contains a core, e.g. of honeycomb structure, embedded in deck panels.

It is a purpose of the invention to design a structure for a vehicle, specifically a passenger motor vehicle, that is made of non-metallic material while offering high strength and light weight, and distinguishing itself by its functional performance.

The present invention meets said purpose by providing a structure for a passenger motor vehicle, comprising a panel structure made of non-metallic material, such as fiber-reinforced plastic, wherein the structure forms a passenger cell, of which the panel structure comprises a front panel structure, a rear panel structure, a floor structure joining the front and rear panel structures, and longitudinal girders that extend between the panel structures and border the floor structure. Additional invention feature details are included in the description and the claims. The invention offers major advantages in that the structure formed by a passenger cell is optimized with regard to lower weight and high strength by its consistence of high-strength non-metallic material, e.g. fiberglass reinforced plastic, preferably CFRP (Carbon Fiber Reinforced Plastics). A front panel structure, a rear panel structure, a floor structure, longitudinal girders and a center tunnel are integrated in the: passenger cell, resulting in functional performance, i.e. the passenger cell offers adequate space to passengers, and additional body sections of the passenger motor vehicle, such as front and rear end, can easily be attached.

Mounted above the front panel structure is e.g. a non-metallic, but high-strength windshield frame, provided with flanges. These flanges hold the windshield frame to the first panel section and the second panel section of the front panel structure by means of adhesive bonding. Inside the hollow spaces of the windshield frame columns, support columns that are connected with the front panel structure are provided. These support columns, combined with the columns of the windshield frame, contribute to passenger safety. Retainer plates that are joined to the metal support columns serve as connectors. These retainer plates are supported by the front panel structure and are bolted to said panel structure.

Furthermore, the passenger cell rear panel structure and e.g. a non-metallic metallic roll bar mounting are structurally joined, resulting in structural and spatial clarity as well as optimizing the roll bar safety function. Additionally, the use of non-metallic materials, preferably composite materials—CFRP—, for the passenger cell and the roll bar mounting, as well as their connection, facilitates production. Finally, there is the option to replace the roll bar mounting by two single roll bars in the area of the passenger seats, creating a compact concept that leaves room for free design.

Other objects, advantages and novel features of the present invention will become apparent from the following detailed description of the invention when considered in conjunction with the accompanying drawings.

DETAILED DESCRIPTION OF THE DRAWINGS

Figure 1:
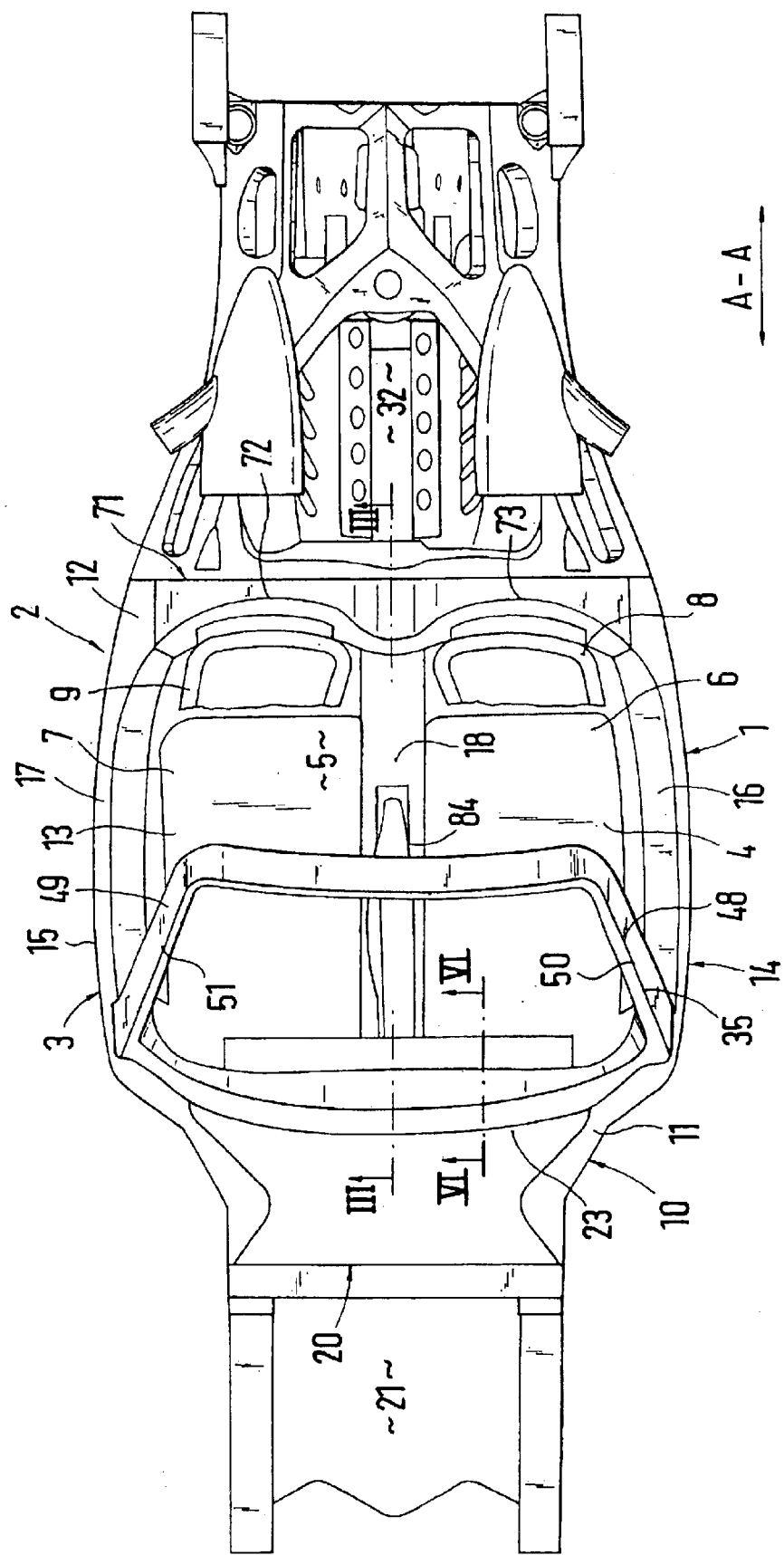
FIG. 1 is a view from above of a passenger motor vehicle with a structure according to a preferred embodiment of the invention.
Figure 2:
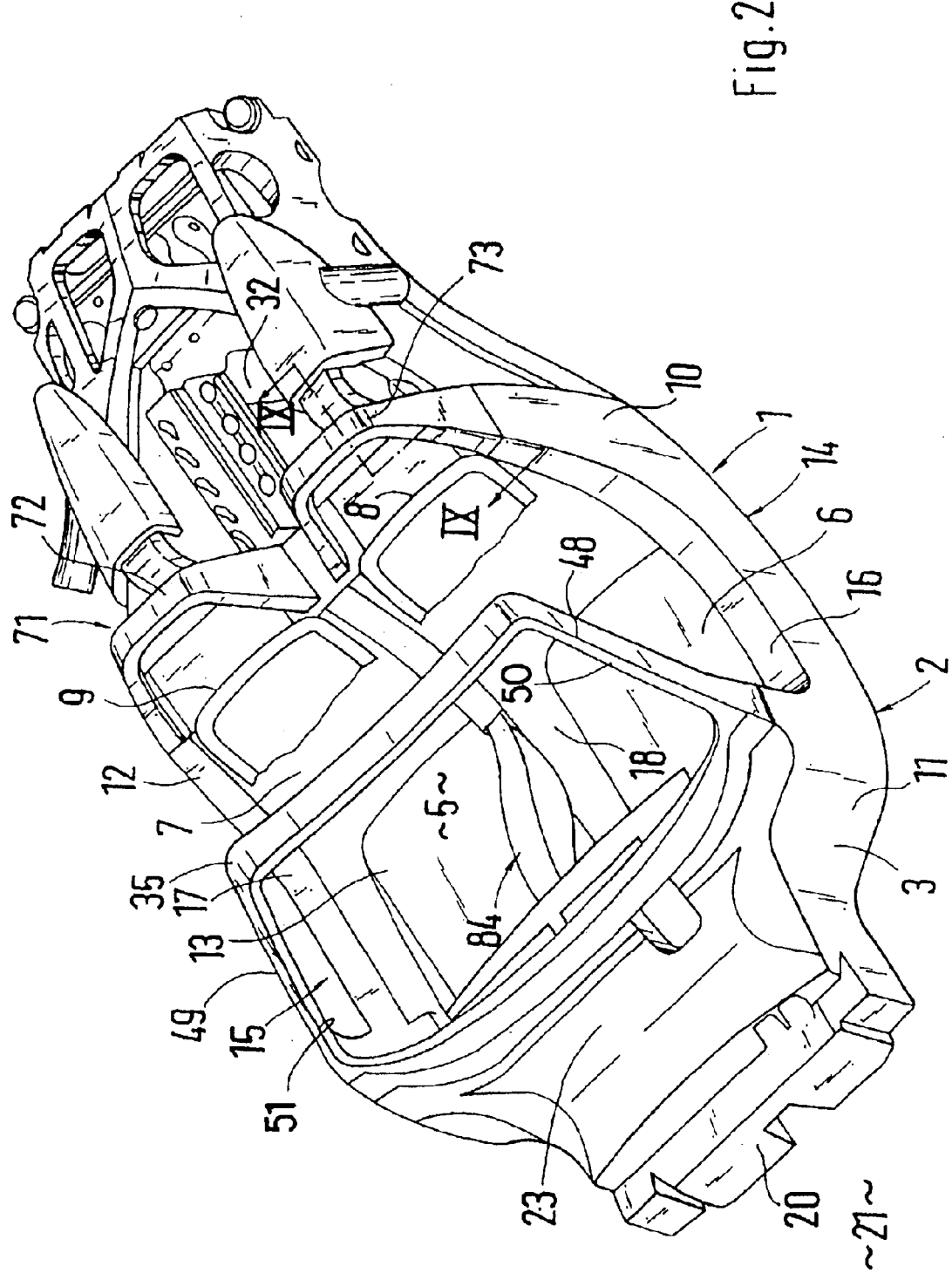
FIG. 2 is an angular view from above of the passenger motor vehicle structure of FIG. 1.

Note that the structure shown to the right of the line/plane identified by reference character 71 in FIGS. 1 and 2 is included to show the environment of the vehicle body structure of preferred embodiments of the present invention and is therefore not further described in detail herein, except for designation of the battery accommodating space 32.

Of a passenger motor vehicle 1 with an open body, essentially only one vehicle body: structure 2 is depicted, which comprises a structure 3. Structure 3 comprises a passenger cell 4 with a passenger compartment 5, with housings 6 and 7 for two side by side passenger seats 8 and 9. The passenger cell 4 is made of high-strength non-metallic material, e.g. fiber-reinforced plastic—composite CFRP —, and includes a panel structure 10 with a front panel structure 11 and a rear panel structure 12, attached to a floor structure 13. The floor structure 13 is bordered on the longitudinal sides 14, 15, by cross-sectional box-shaped side members 16, 17, extending between panel structures 11 and 12, and the floor structure 13 contains a center tunnel 18, which runs between the front panel structure 11 and the rear panel structure 12; the side members 16, 17, and the center tunnel 18 extend in longitudinal vehicle direction A—A.

Figure 3:
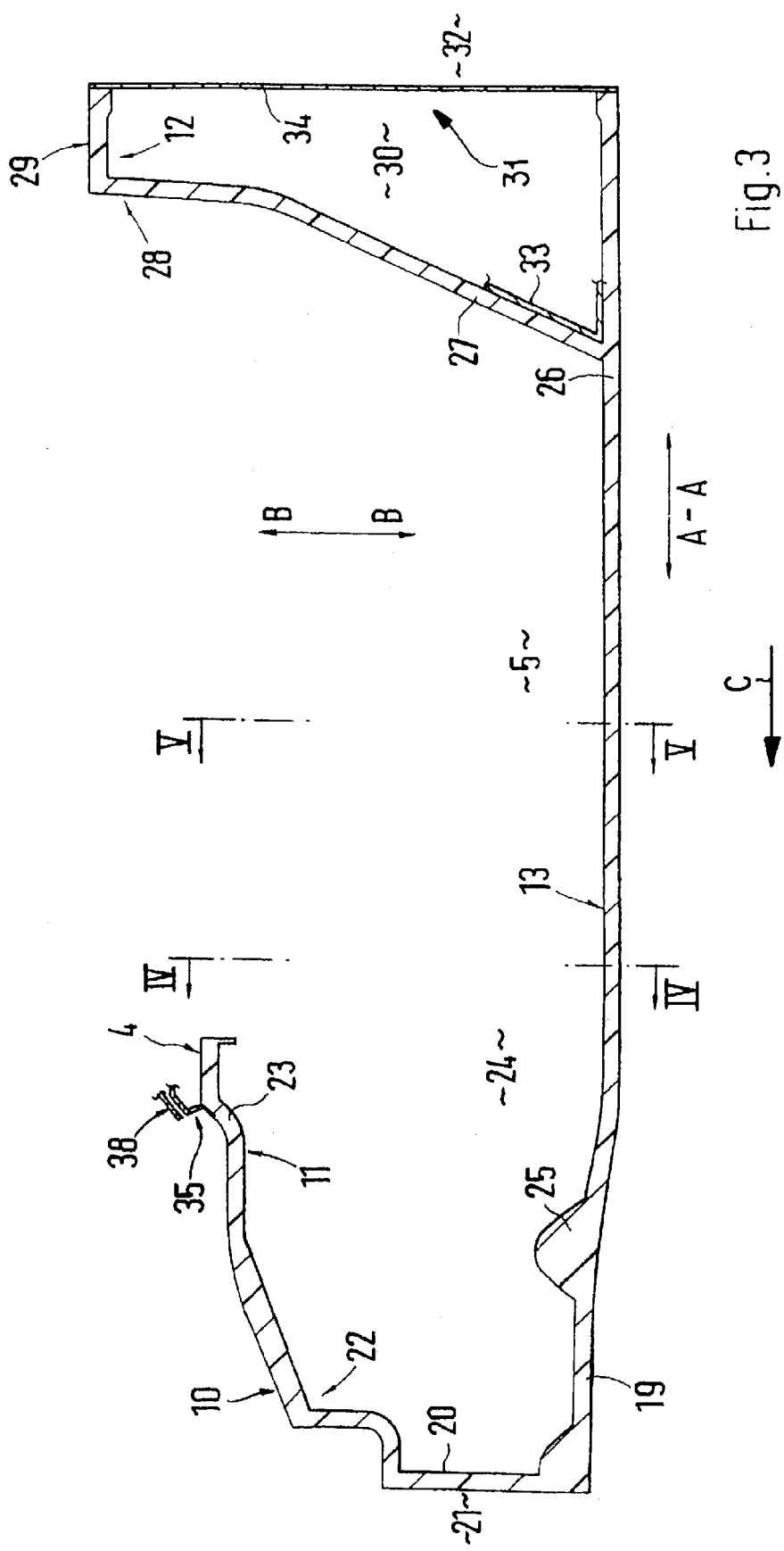
FIG. 3 is a large-scale schematic cross section along line III—III of FIG. 1.
Figure 4:
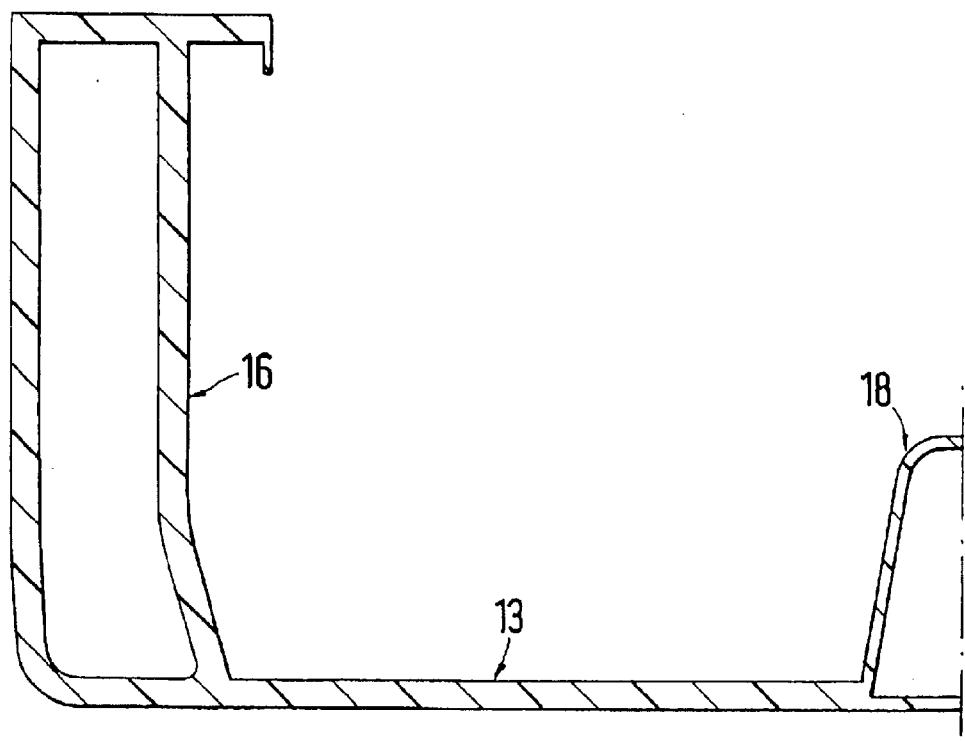
FIG. 4 is a cross sectional view along line IV—IV of FIG. 3.
Figure 5:
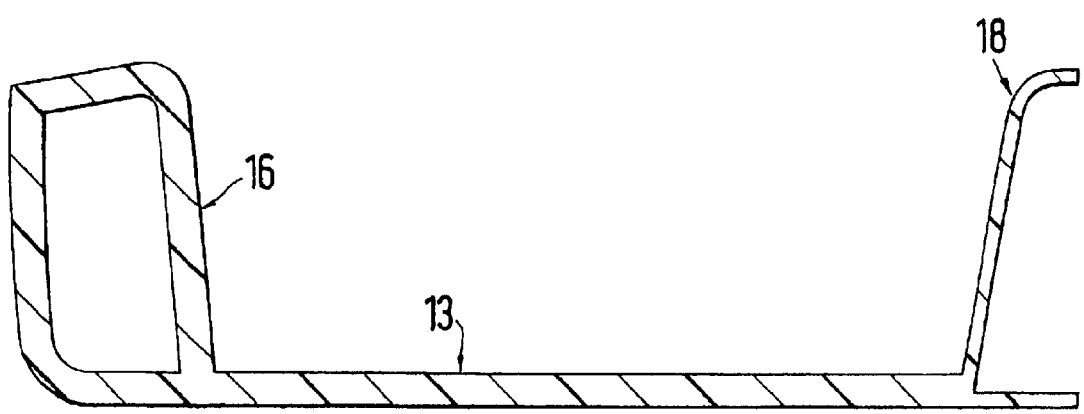
FIG. 5 is a cross sectional view along line V—V of FIG. 3.

The front panel structure 11 (FIG. 3) contains a first panel section 20, which extends from a first floor section 19 of the floor section 13 in vertical vehicle direction B—B and borders a nose compartment 21. A second panel section 23 extends from a top end 22 of the first panel section 20 in a direction opposite the vehicle forward driving direction C. The first floor section 19, the first panel section 21, and the second panel section 23 border a leg compartment 24 of passenger cell 4. Furthermore, the first floor section 19 of the floor structure 13 in the area of the leg compartment 24 is provided with a local thickening 25, which serves as a base for pedals (not shown).

The rear panel structure 12 contains a third panel section 27, which extends from a rear floor section 26 of the floor section 13 in generally vertical vehicle direction B—B. A fourth panel section 29 is attached to the top end 28 of the third panel section 27 and is aligned in a direction opposite of the vehicle forward driving direction C. The rear floor section 26, the third panel section 27, and the fourth panel section 29 border a cavity 30 with an open side 31, which extends toward a battery space 32. The cavity 30 is designed to accommodate a tank 33 for passenger vehicle fuel and can be closed on the open side 31 by means of an upright panel 34.

Figure 6:
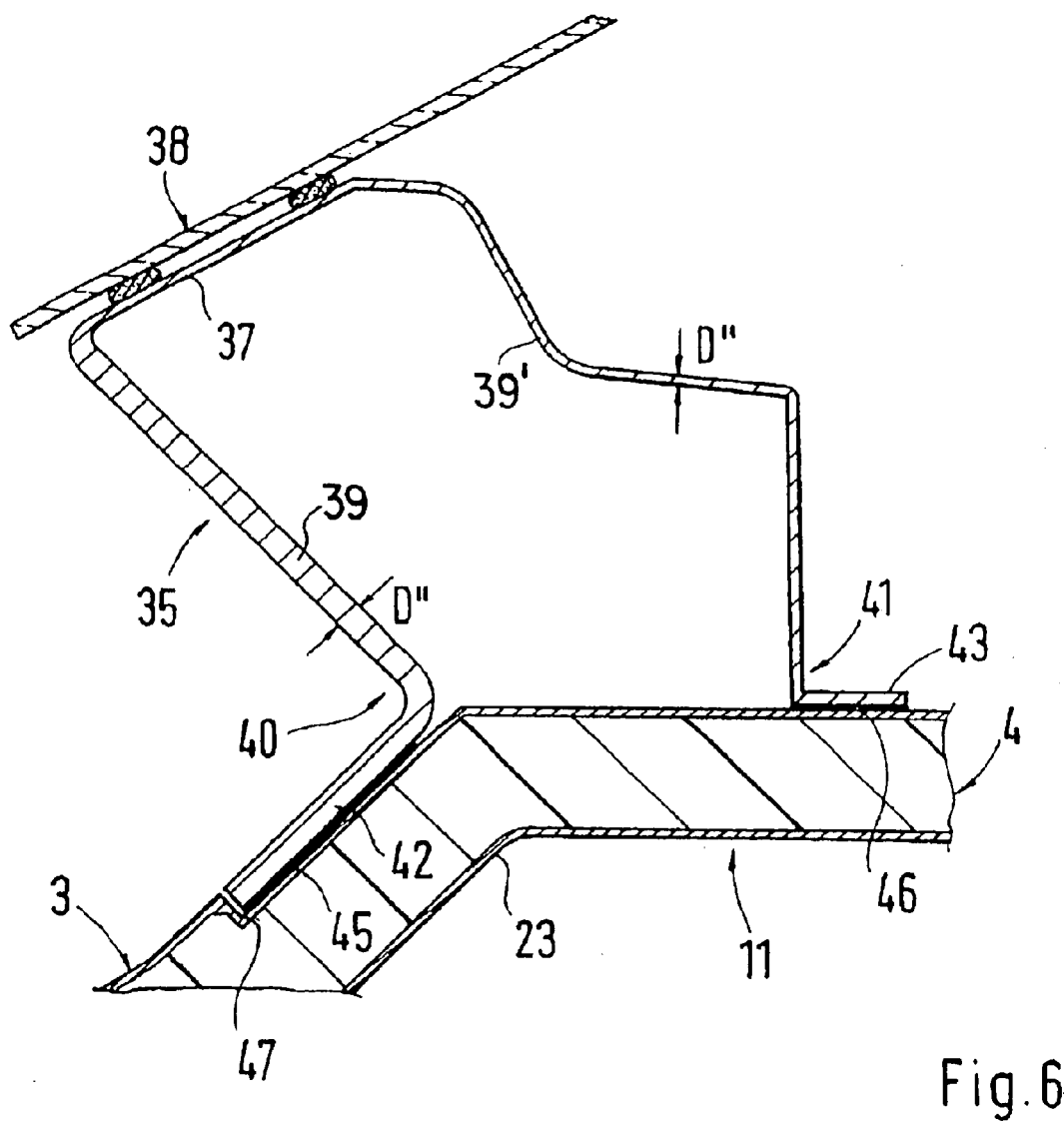
FIG. 6 is a large-scale cross section along line VI—VI of FIG. 1.

According to FIG. 6, the front panel structure 11 and e.g. a non-metallic windshield frame 35 are structurally joined; like the remaining structure 3, or the passenger cell, the windshield frame 35 can be made of high-strength fiber-reinforced plastic—CFRP—, as described in EP 0 286 058 A1. With this, the windshield frame is designed as a hollow member, comprising a bearing panel 37 for a windshield 38. This bearing panel 37 is provided with support panels 39, 39', of which the free ends 40, 41 are provided with flanges 42, 43. The flanges 42, 43 extend to the second panel section 23, and are held in position by adhesive bonding 45, 46. For a flush seat of flange 42 on the second panel section 23, the latter is provided with a recess 47.

Figure 7:
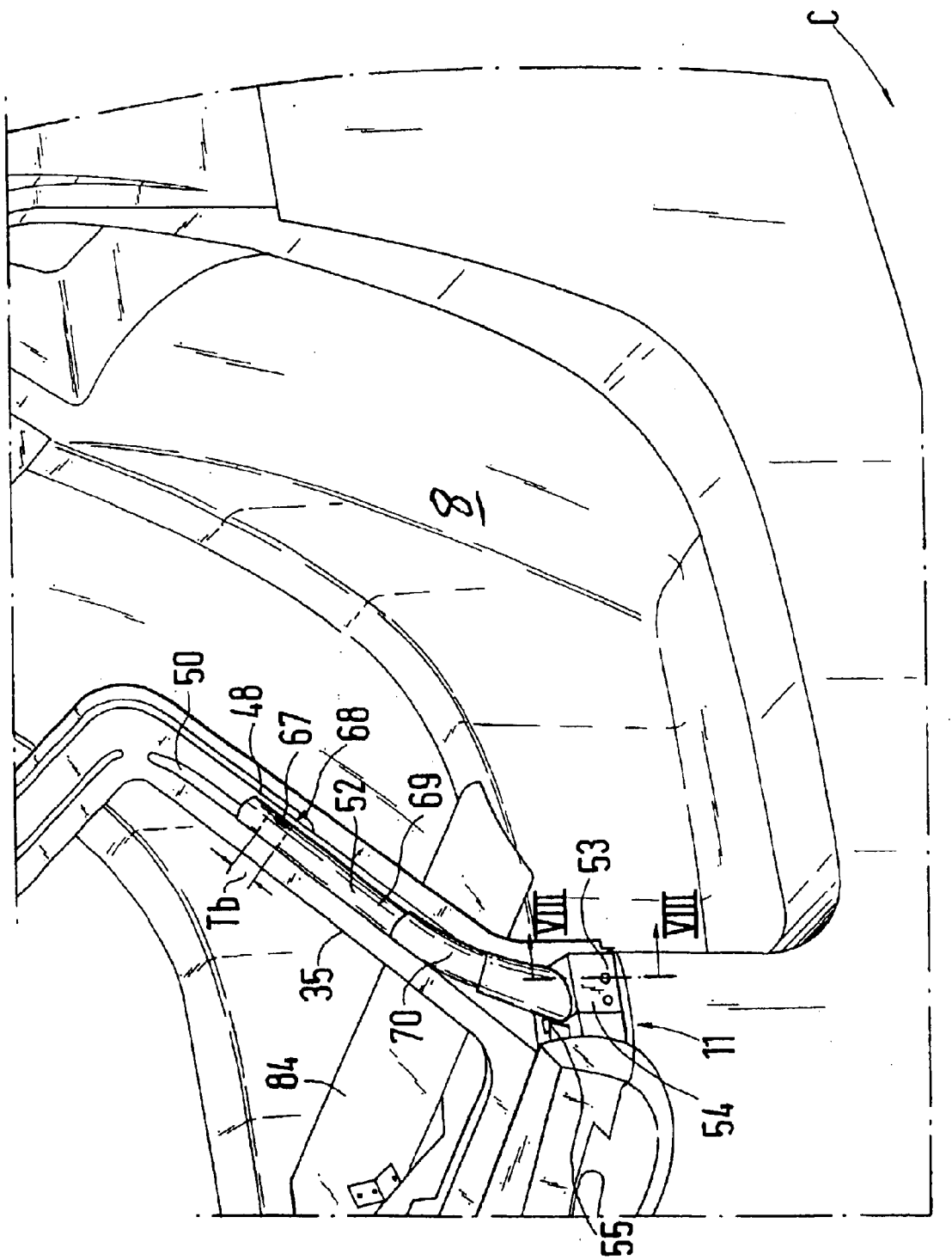
FIG. 7 is an angular view of a windshield frame column of the structure of FIG. 1.
Figure 8:
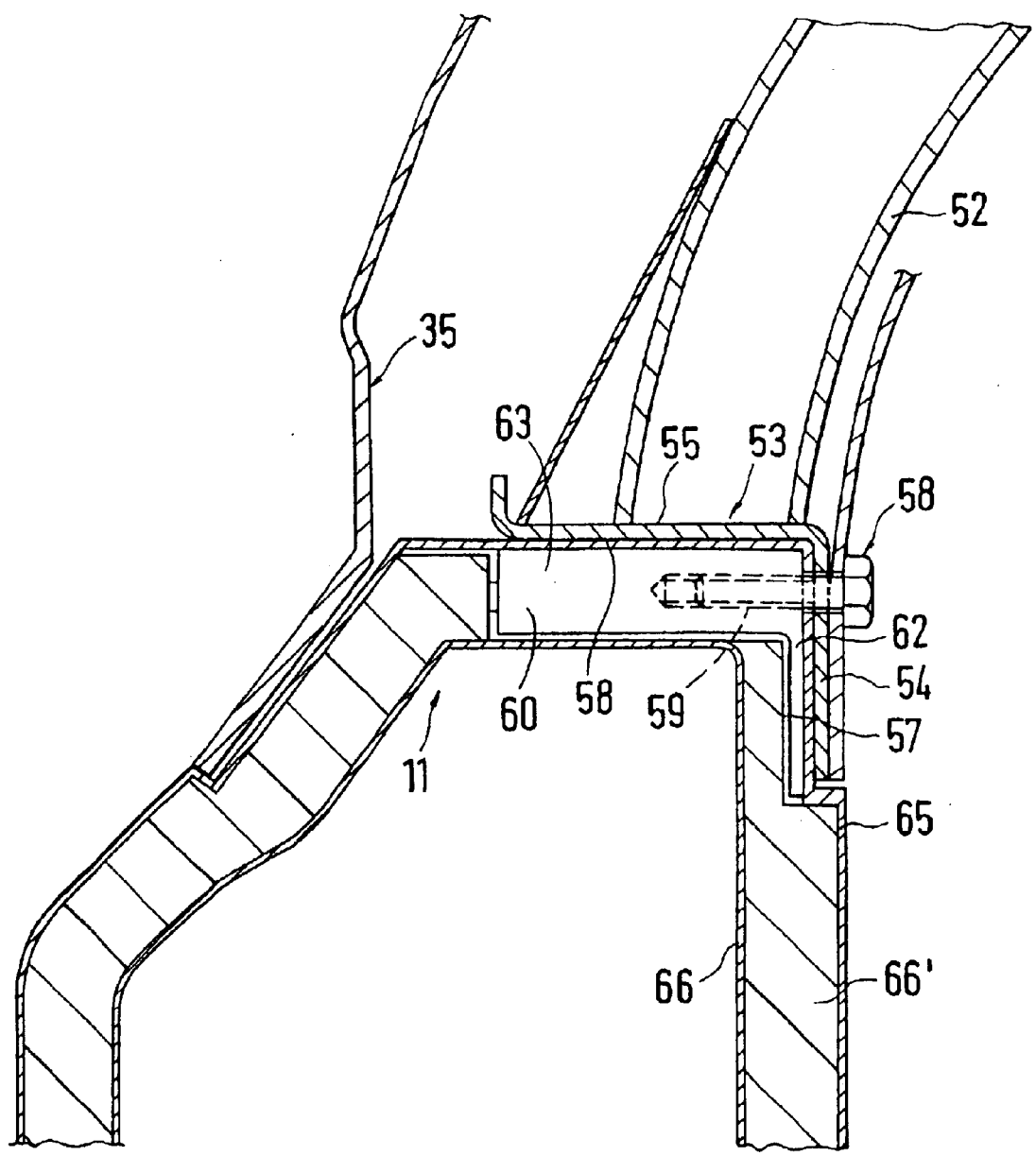
FIG. 8 is a cross sectional view along line VIII—VIII of FIG. 7.
Figure 9:
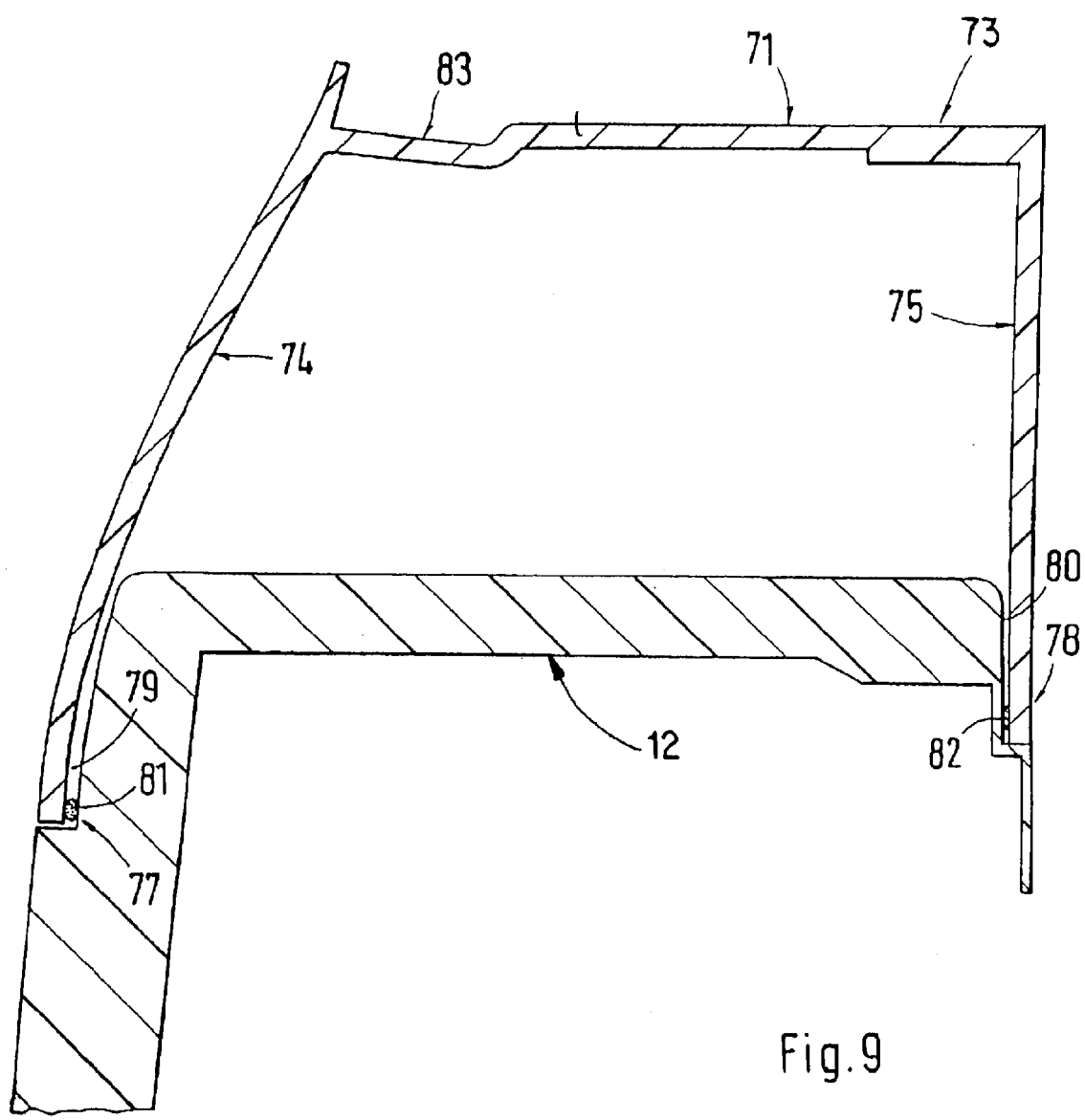
FIG. 9 is a cross sectional view along line IX—IX of FIG. 2.

The windshield frame 35 has upright columns 48, 49, so-called A-pillars, that are provided with hollow spaces 50, 51, containing support columns 52 (FIG. 7). Each support column 52 is made of metal and is attached to the front panel structure 11. The support column 52 is held in position on said panel structure by means of a retainer plate 53. The retainer plate 53 has legs 54, 55 that extend toward each other at an angle. The legs 54, 55 are based on corresponding panel areas 56, 57 of the front panel structure 11, and the retainer plate 53 is fixed by bolts 58, that are aligned with tap holes 59 of a metallic insert 60. The insert 60 with the legs 62, 63 is integrated in the front panel structure 11 in such manner that this insert 60 is covered by contact panels 65, 66, which enclose a core 66' outside the insert 60; this design is described in the above mentioned EP 0 286 058 A1. Between support column 52 and column 48 is foam material 67, which only extends across a relatively small section Tb of a free end 68 of the support column 52. Furthermore, the support column 52 consists of a minimum of two sleeved tubes 69, 70, which, in the embodiment shown, have a circular cross section.

A roll bar mounting 71 is structurally joined with the rear panel structure 12. The roll bar mounting 71 is made of non-metallic material, preferably fiber composite material, such as CFRP. The roll bar mounting 71 consists of two single roll bars 72, 73, which are attached to the rear panel structure 12 in the area of the housings 6, 7 for the passenger seats 8, 9. In a cross-sectional view, each single roll bar, e.g. 73, comprises upright side panels 74, 75 that are spaced in longitudinal vehicle direction A—A and between which a connecting panel 76 extends. The side panels 74, 75 reach the rear panel structure 12 with free ends 77, 78, and rest in recesses 79, 80 of said panel structure 12 by means of adhesive bonding 81, 82. The connecting panel 76 is designed for bearing a roof and has a groove 83 for a seal. The seal lies between the single roll bar 73 and the roof. Finally, FIG. 2 illustrates that the front wall structure 12 is supported on the center tunnel 18 with a support strut 84, which extends in longitudinal vehicle direction A—A and takes a rising course in driving direction C. The support strut 84 is attached to the center tunnel 18 or the front panel structure 12 with bolts, adhesives or the like.

The foregoing disclosure has been set forth merely to illustrate the invention and is not intended to be limiting. Since modifications of the disclosed embodiments incorporating the spirit and substance of the invention may occur to persons skilled in the art, the invention should be constructed to include everything within the scope of the appended claims and equivalent thereof.

What is claimed is:

1. Structure of a passenger motor vehicle, comprising a panel structure made of a non-metallic material, wherein the structure forms a passenger cell, of which the panel structure comprises:

a front panel structure, a real panel structure, a floor structure joining the front and rear panel structures, and longitudinal girders that extend between the panel structures and border the floor structure, wherein the floor structure in an area of a leg compartment is provided with a local thickening as a base for vehicle operating pedals.

2. A passenger motor vehicle body assembly comprising a passenger cell integrally formed by carbon fiber reinforced plastic panel structure comprising:

a front panel structure, a real panel structure, a floor structure joining the front and rear panel structures, and longitudinal girders that extend between the panel structures and border the floor structure, wherein the floor structure in an area of a leg compartment is provided with a local thickening as a base for vehicle operating pedals.

3. A method of making a passenger motor vehicle body assembly comprising a passenger cell, said method comprising integrally forming a carbon fiber reinforced plastic panel structure which includes:

a front panel structure, a real-panel structure, a floor structure joining the front and rear panel structures, and longitudinal girders that extend between the panel structures and border the floor structure, wherein the front panel structure includes a first panel section which extends from a first: floor section of the floor structure upward in a vertical vehicle direction, and a second panel section which extends in a direction opposite a vehicle forward driving direction, and said method comprises adhesive bonding of windshield frame flanges on the first panel section and on the second panel section.

4. A method of making a passenger motor vehicle body assembly comprising a passenger cell, said method comprising integrally forming a carbon fiber reinforced plastic panel structure which includes:

a front panel structure, a real panel structure, a floor structure joining the front and rear panel structures, and longitudinal girders that extend between the panel structures and border the floor structure, comprising structurally joining a non-metallic roll bar mounting to the rear panel structure, and wherein the roll bar mounting comprises two single roll bars, which are attached in areas of the respective housings for the passenger seats.

5. A method according to claim 4, wherein each single roll bar includes upright side panels with a connecting panel extending between them in a cross-sectional view.

6. A method according to claim 5, wherein free ends of the side panels rest in recesses of the rear panel structure and are held in position by means of adhesive bonding.

7. A method according to claim 5, wherein the connecting panel is designed for bearing a roof and is provided with a groove for a seal.

8. Structure for a passenger motor vehicle, comprising a panel structure made of non-metallic material,
wherein the structure forms a passenger cell, of which the panel structure comprises:
a front panel structure;
a rear panel structure;
a floor structure joining the front and rear panel structures, and
longitudinal girders that extend between the panel structures and border the floor structure,
wherein the front panel structure includes a first panel section which extends from a first floor section of the floor structure upward in a vertical vehicle direction, and a second panel section which extends in a direction opposite a vehicle forward driving direction,
wherein the first floor section, the first panel section, and the second panel section border a leg compartment in a passenger compartment of the passenger cell, and
wherein the floor structure in the area of the leg compartment is provided with a local thickening as a base for vehicle operating pedals.

9. Structure according to claim 8, wherein the front panel structure and a non-metallic windshield frame are structurally joined.

10. A structure according to claim 8, wherein the non-metallic material is a fiber-reinforced plastic.

11. Structure for a passenger motor vehicle, comprising a panel structure made of non-metallic material,
wherein the structure forms a passenger cell, of which the panel structure comprises:
a front panel structure,
a rear panel structure,
a floor structure joining the front and rear panel structures; and
longitudinal girders that extend between the panel structures and border the floor structure, and
wherein the front panel structure is supported on a center tunnel by means of a support strut.

12. Structure according to claim 11, wherein the support strut is attached to the center tunnel and the front panel structure with bolts or adhesives.

13. A structure according to claim 11, wherein the non-metallic material is a fiber-reinforced plastic.

14. A method of making a passenger motor vehicle body assembly comprising a passenger cell, said method comprising integrally forming a carbon fiber reinforced plastic panel structure which includes:
a front panel structure,
a real panel structure,
a floor structure joining the front and rear panel structures, and
longitudinal girders that extend between the panel structures and border the floor structure, and
wherein the floor structure in an area of a leg compartment is provided with a local thickening as a base for vehicle operating pedals.

15. A method according to claim 14, comprising structurally joining a non-metallic windshield frame to the front panel structure.

16. A method according to claim 14, comprising structurally joining a non-metallic roll bar mounting to the rear panel structure.

17. Structure for a passenger motor vehicle, comprising a panel structure made of non-metallic material,
wherein the structure forms a passenger cell, of which the panel structure comprises:
a front panel structure,
a rear panel structure,
a floor structure joining the front and rear panel structures; and longitudinal girders that extend between the panel structures and border the floor structure,
wherein the front panel structure includes a first panel section which extends from a first floor section of the floor structure upward in a vertical vehicle direction, and a second panel section which extends in a direction opposite a vehicle forward driving direction
wherein the front panel structure and a non-metallic windshield frame are structurally joined, and
wherein the windshield frame is provided with flanges which are held in position on the first panel section and on the second panel section by means of adhesive bonding.

18. A structure according to claim 17, wherein the non-metallic material is a fiber-reinforced plastic.

19. Structure according to claim 17, wherein hollow spaces of columns of the windshield frame are provided with additional support columns made of metal and joined with the front panel structure.

20. Structure according to claim 19, wherein the rear panel structure and a non-metallic roll bar mounting are structurally joined.

21. Structure for a passenger motor vehicle, comprising a panel structure made of non-metallic material,
wherein the structure forms a passenger cell, of which the panel structure comprises:
a front panel structure,
a rear panel structure,
a floor structure joining the front and rear panel structures, and
longitudinal girders that extend between the panel structures and border the floor structure,
wherein the rear panel structure and a non-metallic roll bar mounting are structurally joined, and
wherein the roll bar mounting comprises two single roll bars, which are attached in areas of the respective housings for the passenger seats.

22. A structure according to claim 21, wherein the non-metallic material is a fiber-reinforced plastic.

23. Structure according to claim 21, wherein each single roll bar includes upright side panels with a connecting panel extending between them in a cross-sectional view.

24. Structure according to claim 23, wherein free ends of the side panels rest in recesses of the rear panel structure and are held in position by means of adhesive bonding.

25. Structure according to claim 23, wherein the connecting panel is designed for bearing a roof and is provided with a groove for a seal.

26. Structure for a passenger motor vehicle, comprising a panel structure made of non-metallic material,
    wherein the structure forms a passenger cell, of which the panel structure comprises:
    a front panel structure,
    a rear panel structure,
    a floor structure joining the front and rear panel structures; and longitudinal girders that extend between the panel structures and border the floor structure,
    wherein the front panel structure includes a first panel section which extends from a first floor section of the floor structure upward in a vertical vehicle direction, and a second panel section which extends in a direction opposite a vehicle forward driving direction,
    wherein the rear panel structure includes a third panel section which extends from a second floor section of the floor structure upward in a vertical vehicle direction, and a fourth panel section which extends in a direction opposite the vehicle forward driving direction, and
    wherein the second floor section, the third panel section, and the fourth panel section border a cavity with an open side.

27. Structure according to claim 26, wherein the cavity can be closed with a vertical panel and is designed to accommodate a tank for passenger vehicle fuel.

28. Structure according to claim 26, wherein the front panel structure and a non-metallic windshield frame are structurally joined.

29. A structure according to claim 26, wherein the non-metallic material is a fiber-reinforced plastic.

30. Structure according to claim 26, wherein said front panel structure, said rear panel structure, said floor structure, and said longitudinal girders are integrally formed of said non-metallic material.

31. Structure according to claim 30, wherein said non-metallic material is fiber-reinforced plastic.

32. Structure according to claim 31, wherein said fiber reinforced plastic is carbon fiber reinforced plastic (CFRP).

33. Structure for a passenger motor vehicle, comprising a panel structure made of non-metallic material,
    wherein the structure forms a passenger cell, of which the panel structure comprises:
    a front panel structure,
    a rear panel structure,
    a floor structure joining the front and rear panel structures; and longitudinal girders that extend between the panel structures and border the floor structure,
    wherein the front panel structure and a non-metallic windshield frame are structurally joined,
    wherein the hollow spaces of columns of the windshield frame are provided with additional support columns made of metal and joined with the front panel structure, and
    wherein each support column is held in position on the front panel structure by means of a retainer plate.

34. Structure according to claim 33, wherein the support columns are joined with columns of the windshield frame only in an area of free ends of the support columns by means of foam material.

35. Structure according to claim 33, wherein each support column consists of a minimum of two sleeved tubes.

36. A structure according to claim 33, wherein the non-metallic material is a fiber-reinforced plastic.

37. Structure according to claim 33, wherein the retainer plate has legs which extend toward each other at an angle and rest on corresponding panel sections of the front panel structure.

38. Structure according to claim 37, wherein the retainer plate is held in position with bolts which are aligned to tap holes of a metallic insert integrated in the front panel structure.

39. Structure according to claim 37, wherein the support columns are joined with columns of the windshield frame only in an area of free ends of the support columns by means of foam material.

* * * * *